Patented Apr. 1, 1930

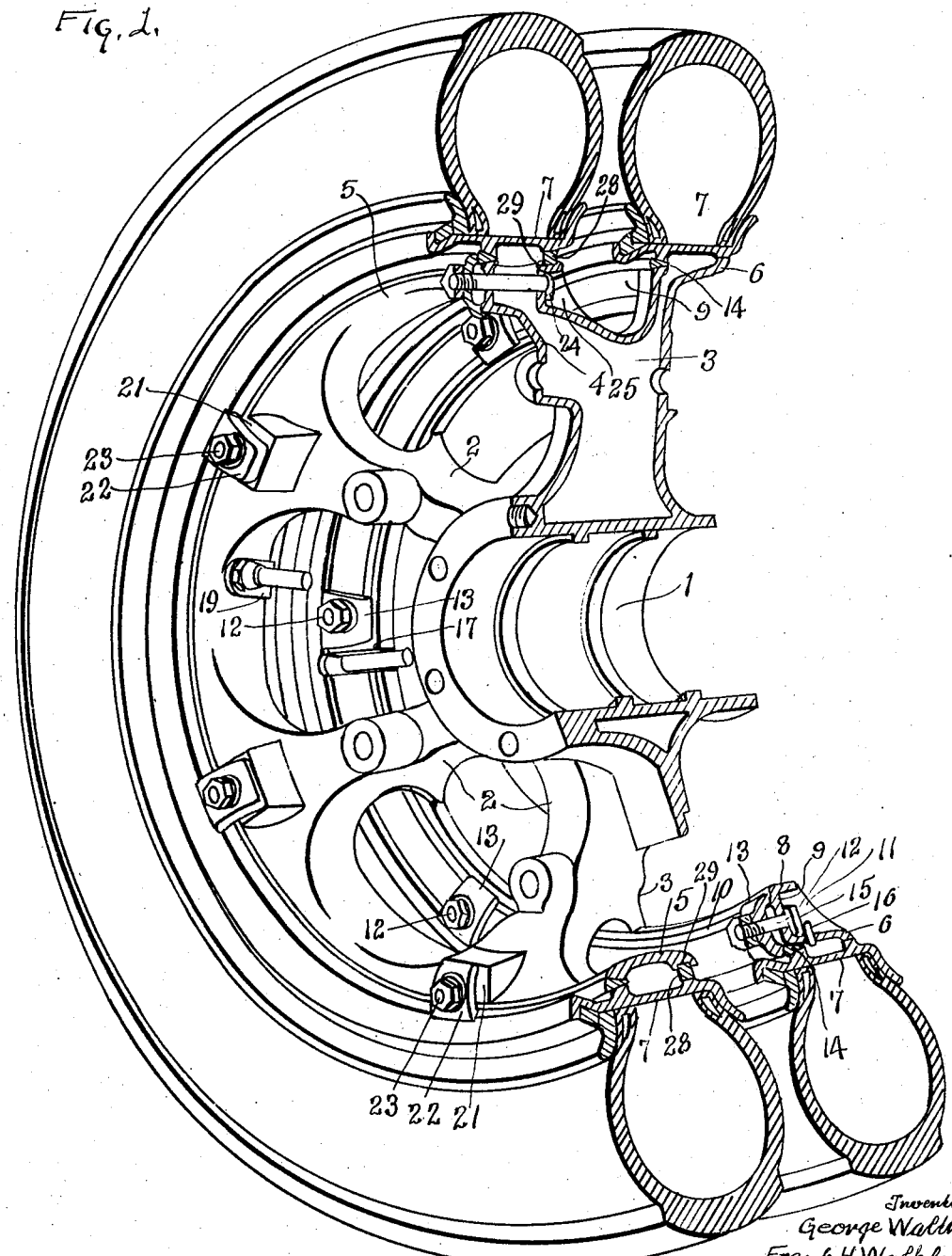

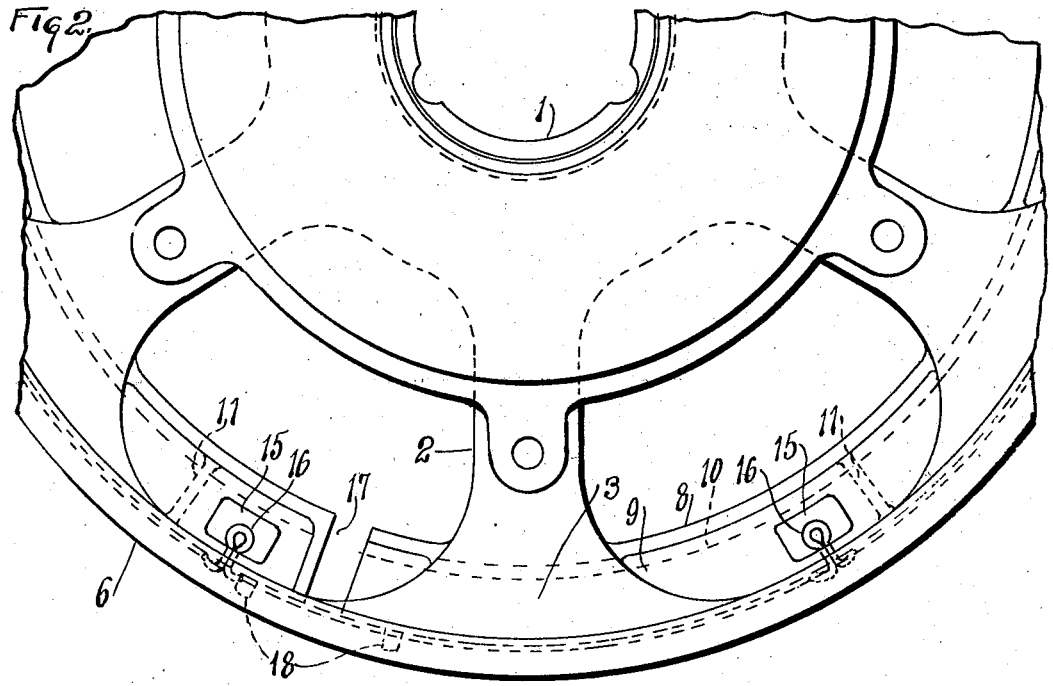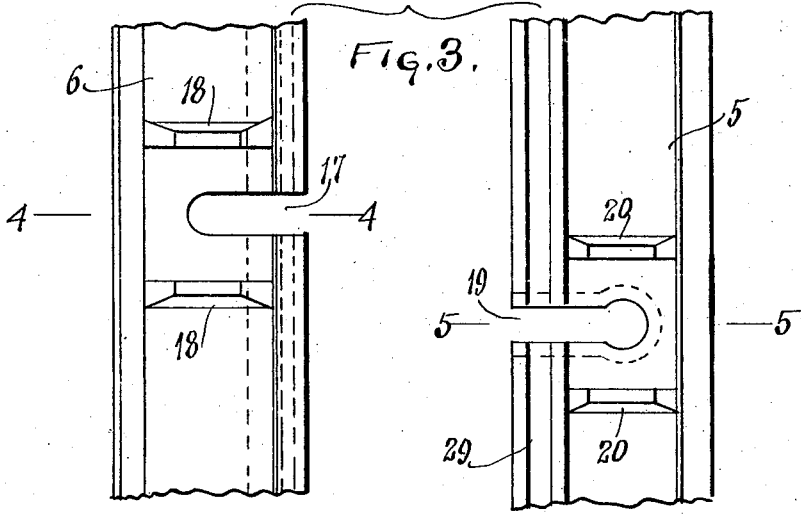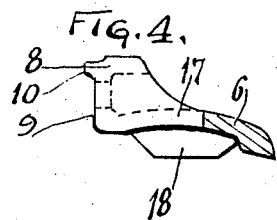

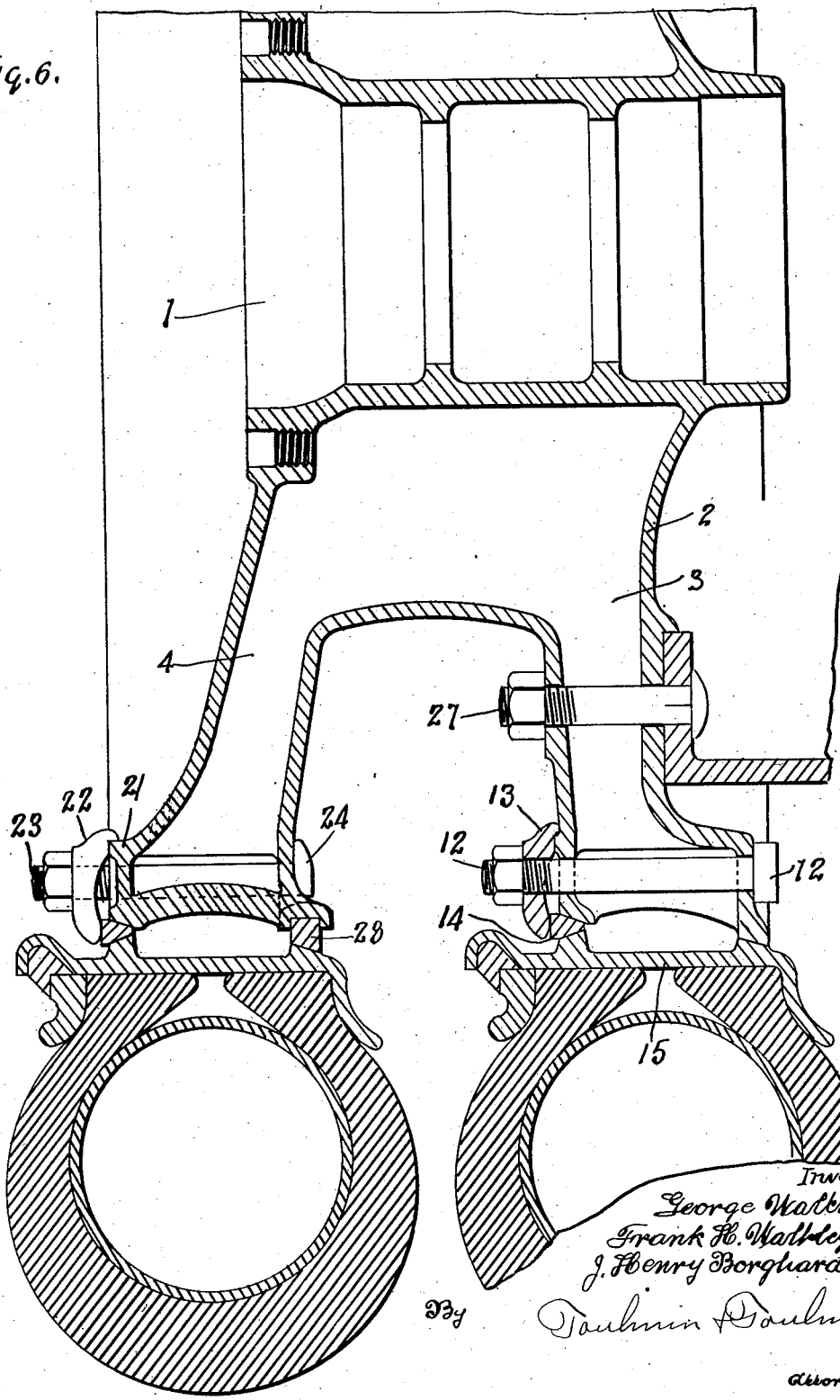

1,752,317

UNITED STATES PATENT OFFICE

GEORGE WALTHER, FRANK H. WALKLEY, AND JOHN HENRY BORGHARDT, OF DAYTON, OHIO, ASSIGNORS TO THE DAYTON STEEL FOUNDRY COMPANY, OF DAYTON, OHIO, A CORPORATION OF OHIO

WHEEL

Application filed April 18, 1923. Serial No. 632,826.

Our invention relates to wheels for vehicles, and more particularly to wheels of the dual pneumatic type, in which a pair of pneumatic tires are mounted side by side on the wheel.

The object of our invention is to provide means of attaching demountable rims on dual pneumatic wheels so that the attaching devices for each rim will not interfere with one another and may be separably operated, whereby both tires may be readily removed and replaced without detaching the wheel from its axle.

It is a further object of our invention to provide a form of rim of box-like construction for reinforcing and strengthening the rim of the wheel.

It is a further object to provide such a rim and wheel which will form a rigid construction for supporting the attaching devices and the demountable rim.

It is a further object to provide a novel arrangement of the driving lugs in connection with the wheel rim.

It is an additional object to provide a staggered relationship of the grooves in the wheel rims for receiving the valve stems on the demountable rims and a staggered relationship of the retaining devices for the demountable rim as well as a staggered relationship of the driving lugs.

Referring to the drawings:

Fig. 1 is a perspective view, partially in section, of a complete wheel with demountable rims and tires;

Fig. 2 is a vertical view looking at the inner face of the wheel;

Fig. 3 is a plan view of a portion of the inside and outside rims showing the staggered relationship of the valve stem slots and the driving lugs;

Fig. 4 is a section on the line 4—4 of Fig. 3;

Fig. 5 is a section on the line 5—5 of Fig. 3;

Fig. 6 is a section showing a modified form of spoke construction.

It has been found in mounting pneumatic tires on demountable rims used upon dual pneumatic wheels that the location of the lugs and bolts for retaining the inner demountable rim on the inner rim of the wheel caused considerable difficulty due to the fact that heretofore it has been the practice of locating such retaining means on the spokes and therefore the retaining means for the demountable rim on the inner wheel rim would be behind the outer portion of the spoke which would render it difficult for access thereto.

This was also true of the slots for the valve stem and true of the driving lugs.

It was particularly disadvantageous when it was necessary to adjust or tighten the retaining devices.

It will be understood that the terms "inner spoke and outer spoke", as used throughout the specification and claims, have reference to the two branches from the main spoke, the outer spoke extending laterally of the main spoke portion and the inner spoke extending radially thereof.

Referring to the drawings, 1 is a hub to which are connected the walls of the main portions of the spokes 2 which are of hollow cast metal construction. Each main spoke 2 diverges into two arms respectively designated 3 for the radial inner spoke arm and 4 for the lateral outer spoke arm.

The side walls of the outer hollow spoke arms 4 merge into one another to form an outer wheel rim, as shown at 5. The side walls of the inner hollow spoke arms 3 form a wheel rim having an outer portion 6 adapted to engage with a demountable rim 7 and a vertical or web portion 9 and horizontal portion 8 which form a U-shaped flange. The vertical or web portion 9 is provided with a rib 10 which forms a seat for lugs or clamps 13. These clamps 13 are held in position by bolts 12 passing through the web 9 of the inner wheel rim and adapted to receive a nut. When the lugs 13 are so held in position they serve to retain a wedging ring 14 between the wheel rim and the demountable rim, whereby the demountable rim 7 is held in position on the inner wheel rim 6.

Referring to Figure 1 it will be seen that by locating the lugs 13 and bolts 12 constituting the retaining means for the demountable rim on the inner wheel rim between the spoke ends and so fashioning the outer wheel rim between the spoke ends, that the distance from the center of the hub to said retaining bolts 12 is less than the distance from the hub center to the inner circumference of the outer rim, an operating tool may be used on the retaining means to tighten or loosen the same without interference from the outer rim. Reinforcing ribs 11 cooperate with the inner wheel rim structure 6, 8 and 9 to strengthen the rim and form a box-like structure.

To prevent the bolts 12 from getting out of position cotter pins 16 are inserted in the wheel rim with their free ends bent over upon the periphery of the rim and their heads extending into the boxes in the path of the heads 15 of the bolts 12.

The box portion of the inner wheel rim is also provided with a slot 17 for the reception of the valve stem on the inner demountable rim 7. Driving lugs 18 are provided in the inner wheel rim for engagement with the corresponding lugs on the demountable rim.

It will be noted in Fig. 3 that the position of the slot 17 and driving lugs 18 on the inner rim 6 is staggered with respect to the position of the corresponding slot 19 and driving lugs 20 on the outer rim 5.

On the outer spoke arms 4 we provide bosses 21 which serve as supports for the lugs 22 mounted on the bolts 23. The inner ends of these bolts are provided with heads 24 which project into a recess 25 formed in the inner wall of the outer spoke, thus preventing the bolt from turning.

A similar arrangement is provided for the bolts on the inner wheel rim and their heads are adapted to fit in the recess formed between the wall 8 and the wheel rim. Otherwise the construction of the wheels follow standard practice of the mounting of demountable rims and the use of locking rings.

Referring to Fig. 6, it will be observed that we have provided for the location of the brake drum bolts 27 on the inner spokes only. In the construction shown in the other views of the drawings we have provided for a long bolt which passes through the main spoke from front to rear.

It will also be noted that we employ a demountable ring 28 which fits in the depression 29 in the outer spoke wheel rim 5 and constitutes a wedge between the wheel rim and the demountable rim 7 and serves to keep the two rims in proper relation to one another.

It will be understood that we comprehend within our invention suitable modifications and do not desire to be limited to the specific form shown nor to the details of construction.

Having thus fully described our invention, what we claim as new and desire to secure by Letters Patent, is:—

In a dual pneumatic wheel, a hub and main spokes, each main spoke having outer and inner spoke portions, outer and inner rims on said spoke portions, means for attaching demountable rims to the respective wheel rims staggered in relationship to one another, the retaining means on the inner rim being located between the spokes, and that portion of said outer rim between the spoke ends being so fashioned that the distance from the hub center to said retaining means on the inner rim is less than the distance from the hub center to the opposite inner circumference of the outer rim, whereby an operating tool may be used on said inner retaining means without interference from said outer rim.

In testimony whereof, we affix our signatures.

GEORGE WALTHER.
FRANK H. WALKLEY.
J. HENRY BORGHARDT.